United States Patent Office.

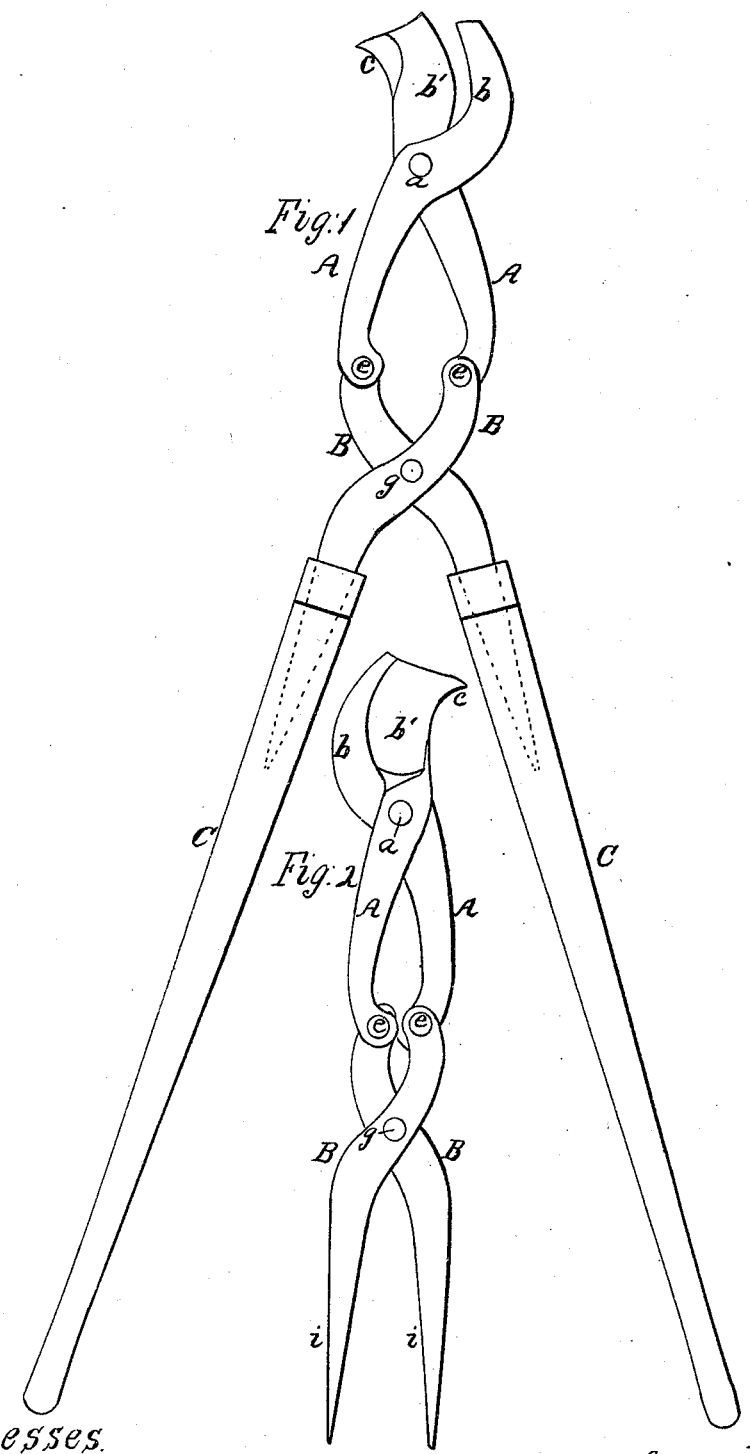

S. A. McFARLANE, OF GRAND RAPIDS, MICHIGAN.

Letters Patent No. 92,202, dated July 6, 1869.

IMPROVEMENT IN PRUNING-SHEARS.

The Schedule referred to in these Letters Patent and making part of the same.

*To all whom it may concern:*

Be it known that I, S. A. McFARLANE, of Grand Rapids, in the county of Kent, and State of Michigan, have invented a new and useful Improvement in Pruning-Shears; and I do hereby declare that the following is a full, clear, and exact description thereof, reference being had to the accompanying drawings, making part of this specification, in which—

Figure 1 is a side view of the shears, complete.

Figure 2 shows the shears detached from their handles.

Similar letters of reference indicate corresponding parts in the two figures.

This invention consists in pruning-shears, the handles of the blades of which are pivoted to levers which terminate in pointed shanks adapted for entering the ends of wooden arms or handles, and securing the shears thereto in a substantial manner, as will be hereinafter explained.

To enable others skilled in the art to understand my invention, I will describe its construction and operation.

In the accompanying drawings—

A A represent two levers, which are pivoted together at *a*, and which have their shortest arms formed into cutting-shears with curved cutting-edges. The cutting-edge of blade *b* is hooked, and the cutting-edge of blade *b'* is convex, thus preventing branches which are in the grasp of these blades from slipping therefrom during the cutting-operation. The back edge of the blade *b'* terminates at its outer end in a hook, *c*, which is sharpened and adapted to serve as a pruning-hook.

The longest arms of the shear-levers A A are curved inwardly, as shown in the drawings, and connected by pivots *e e* to the ends of toggle-levers B B, which latter are crossed and pivoted together at *g*.

The longest arms of these toggle-levers are tapered and pointed, so as to form shanks *i i*, that are driven into the ends of wooden handles C C.

It will be seen from the above description that I have produced an instrument consisting of toggle-levers terminating in shear-blades at one end, and in spiked shanks at the other ends; and it will also be seen that the longest arms of the shear-levers are curved and pivoted to the toggle-levers B B, in such manner that, in using the instrument, the handles C C do not come together, as the jointed ends of the levers strike just at the moment the cutting-edges of the shears meet; this will prevent injury to the hands in cutting off branches.

I am aware that the principle of toggles combined with shears is not new, and I do not claim this feature broadly.

I have effected the combination of shears and toggles in such manner that one pair of levers constitutes the cutters or shears, and a pruning-hook, *c*, and the other pair of shears constitutes the spiked shanks by which the handles C C can be securely fastened to the instrument.

Having described my invention,

What I claim as new, and desire to secure by Letters Patent, is—

Toggle-levers A B, terminating in shear-blades *b b'* at their outer ends, and in spiked shanks *i i*, at their opposite ends, and otherwise constructed and adapted to operate substantially as described.

In witness that I have claimed and do claim the foregoing, I have hereunto set my hand and seal this 29th day of April, A. D. 1869.

S. A. McFARLANE. [L. S.]

Witnesses:
EDWARD TAGGART,
MARK M. POWERS.